(12) United States Patent
Bae et al.

(10) Patent No.: US 11,710,997 B2
(45) Date of Patent: Jul. 25, 2023

(54) MOTOR HOUSING WITH AN INTEGRATED COOLING PASSAGE

(71) Applicants: HYUNDAI MOTOR COMPANY, Seoul (KR); KIA MOTORS CORPORATION, Seoul (KR)

(72) Inventors: Sung Ik Bae, Suwon-si (KR); Jae Won Ha, Hwaseong-si (KR); Dong Jae Kim, Busan (KR); Myung Kyu Jeong, Siheung-si (KR); Hee Ra Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 269 days.

(21) Appl. No.: 17/015,793

(22) Filed: Sep. 9, 2020

(65) Prior Publication Data

US 2021/0184542 A1    Jun. 17, 2021

(30) Foreign Application Priority Data

Dec. 12, 2019   (KR) .......................... 10-2019-0165710

(51) Int. Cl.
*H02K 9/193* (2006.01)
*H02K 1/20* (2006.01)
*H02K 5/20* (2006.01)

(52) U.S. Cl.
CPC ............... *H02K 9/193* (2013.01); *H02K 1/20* (2013.01); *H02K 5/203* (2021.01)

(58) Field of Classification Search
CPC ................................. H02K 5/20; H02K 5/203
See application file for complete search history.

(56) References Cited

U.S. PATENT DOCUMENTS

| 2011/0095634 A1* | 4/2011 | Lamke | H02K 7/006 310/91 |
| 2011/0169352 A1* | 7/2011 | Nagao | H02K 11/33 310/59 |
| 2014/0292117 A1* | 10/2014 | Lee | H02K 5/203 310/54 |

FOREIGN PATENT DOCUMENTS

| DE | 102010039300 A1 * | 2/2012 | ............. H02K 1/148 |
| GB | 2284943 A * | 6/1995 | ............... H02K 5/20 |
| JP | 06070507 A * | 3/1994 | |

OTHER PUBLICATIONS

Ewert (DE-102010039300-A1) English Translation (Year: 2012).*
Hamashima (JP 06070507 A) English Translation (Year: 1994).*

* cited by examiner

*Primary Examiner* — Tulsidas C Patel
*Assistant Examiner* — Robert E Mates
(74) *Attorney, Agent, or Firm* — Lempia Summerfield Katz LLC (57) ABSTRACT

A cooling-channel integrated motor housing includes a motor housing, a plurality of stator cores press-fitted into the motor housing, and a cooling pipe inserted into the motor housing and disposed in a circumferential direction of a circle along which the stator cores are arranged. The 1cooling pipe is disposed to overlap with the stator cores in a direction perpendicular to a direction in which a rotating shaft of a motor extends.

8 Claims, 5 Drawing Sheets

MOTOR HOUSING WITH AN INTEGRATED COOLING PASSAGE

CROSS REFERENCE TO RELATED APPLICATION

The present application claims priority to Korean Patent Application No. 10-2019-0165710, filed Dec. 12, 2019, the entire contents of which are incorporated herein for all purposes by this reference.

BACKGROUND OF THE DISCLOSURE

Field of the Disclosure

The present disclosure relates to a cooling-passage integrated motor housing, i.e. a motor housing with an integrated cooling passage, in which a motor housing and a cooling pipe are integrally formed.

Description of the Related Art

An eco-friendly vehicle is equipped with an electric motor that drives the vehicle by the power of a high-voltage battery. A driving motor is composed of main components to generate output, such as a permanent magnet, a core, or a coil. Due to electric resistance or magnetic resistance generated in the components when a current or a magnetic force flows, heat is generated in the motor. This may result in irreversible deterioration of component performance under high-temperature conditions above a certain temperature. Such deterioration leads to damage to the components and degradation of motor performance. Therefore, in order to maintain the motor performance, cooling is essential to keep the motor temperature at a predetermined level. If the motor temperature may be kept low by cooling, a motor driving time can be increased and, consequently, the fuel efficiency and operability of the eco-friendly vehicle can be improved.

An air cooling method of cooling a motor may be used in which a heat dissipation fin is formed in a motor housing to perform a cooling operation by external cooling air. A water cooling method of cooling a motor may be used in which a cooling channel is formed inside the motor housing or outside a stator to perform a cooling operation by coolant. The motor to which the water cooling method is applied includes a support ring that connects a stator core and a housing and defines a path in which coolant circulates. The support ring is disposed between the stator core and the housing to connect the stator core and the housing. A cooling passage is formed between the support ring and the housing. However, this is problematic in that a process is complicated due to a support-ring coupling process and in that the support ring is additionally required. Thus, the cost for manufacturing the motor is increased. Furthermore, the cooling passage between the support ring and the housing is not manufactured in a sealed structure. As a result, coolant may leak out and thus the performance of the motor may be degraded.

SUMMARY OF THE DISCLOSURE

The present disclosure has been made in order to solve the above-mentioned problems in the related art. An objective of the present disclosure is to provide a motor housing with an integrated cooling-passage that cools a stator core through a cooling pipe inserted into a motor housing.

Another objective of the present disclosure is to provide a motor housing with an integrated cooling-passage that has a cooling pipe integrally provided in a motor housing so as to prevent the leakage of coolant.

In order to achieve the objectives of the present disclosure, the disclosure provides a cooling-channel integrated motor housing, i.e., a motor housing with an integrated cooling-channel. The cooling-channel integrated motor housing includes a motor housing, a plurality of stator cores press-fit into the motor housing, and a cooling pipe inserted into the motor housing and disposed in a circumferential direction of a circle along which the stator cores are arranged. The cooling pipe is disposed to overlap with the stator cores in a direction perpendicular to a direction in which a rotating shaft of a motor extends.

The cooling pipe may be connected to a coolant injection nipple and a coolant discharge nipple installed in the motor housing. The motor housing may include a first region between the coolant injection nipple and the coolant discharge nipple and may include a second region other than the first region.

The cooling pipe may be provided in two stages in a direction parallel to the rotating shaft of the motor. The coolant discharge nipple may be disposed on an upper stage of the motor housing in the direction in which the rotating shaft extends. The coolant injection nipple may be disposed on a lower stage of the motor housing.

The cooling pipe may be provided in one stage in the first region and the cooling pipe may be provided in two stages in the second region.

The cooling pipe in the second region may be disposed so as not to protrude above a height level of an upper surface of the stator core and below a height level of a lower surface thereof in a direction parallel to the rotating shaft of the motor.

The cooling pipe may include a bent part that is bent from the lower stage to the upper stage of the motor housing by a sensor connector provided in the first region.

A water pump and a clutch actuator may be attached to the motor housing. The water pump and the clutch actuator may be attached to the second region of the motor housing.

One end and the other end of the cooling pipe connected to the coolant injection nipple and the coolant discharge nipple may be bent in a circumferential direction with respect to the rotating shaft of the motor.

A high-voltage connector and a sensor connector may be provided in the first region.

The cooling pipe may be formed of an aluminum material.

According to an embodiment of the present disclosure, a stator core is fixed to a motor housing through a press-fitting process, thus eliminating a separate component (existing support ring) for connecting the motor housing to the stator core. As the support ring is eliminated, a process of manufacturing a driving motor can be simplified and the cost of manufacturing the driving motor can be saved.

According to an embodiment of the present disclosure, the position of a cooling pipe may be disposed at a height similar to that of a stator core. In other words, the coolant circulating in the cooling pipe may approach the stator core as close as possible to cool the stator core. Therefore, the efficiency of cooling the stator core can be improved.

According to an embodiment of the present disclosure, since a cooling pipe is inserted into a motor housing, a space in which the motor housing and a peripheral component may be connected may be insufficient. Therefore, the peripheral component of a driving motor may be connected to a space between a coolant injection nipple and a coolant discharge nipple and in which the cooling pipe is wound relatively less.

DETAILED DESCRIPTION OF THE DISCLOSURE

The above and other objects, features, and other advantages of the present disclosure will be more clearly understood from the following detailed description when taken in conjunction with the accompanying drawings. However, the disclosure should not be limited to embodiments set forth herein and may be implemented in a variety of forms. The embodiments described herein are provided to make the disclosure complete and to fully convey the spirit of the disclosure to those having ordinary skill in the art. The disclosure is defined merely by the scope of claims. The same reference numerals are used throughout the drawings to designate the same components.

The terms " . . . part", " . . . unit", " . . . module" and the like described herein may mean a unit for processing at least one function or operation, and they may be implemented in hardware, software or a combination of hardware and software.

Furthermore, the terms "first", "second" and the like are used herein to divide components in the same relationship but are not necessarily limited to a particular order in the following description.

The detailed description is for illustrative purpose only. In addition, the foregoing is intended to illustrate embodiments of the present disclosure. The present disclosure may be used in a variety of different combinations, modifications, and embodiments. In other words, changes or modifications may be made within the scope of the concept of the disclosure disclosed herein, equivalents of the disclosure, and/or the ordinary skill or knowledge in the art. The embodiments describe the best mode for implementing the technical spirit of the present disclosure, and various modifications are possible in the specific application field and use of the present disclosure. Therefore, the above description of the embodiments is not intended to limit the disclosure to the disclosed embodiments. Furthermore, the appended claims should be construed as including other embodiments.

Figure 1:
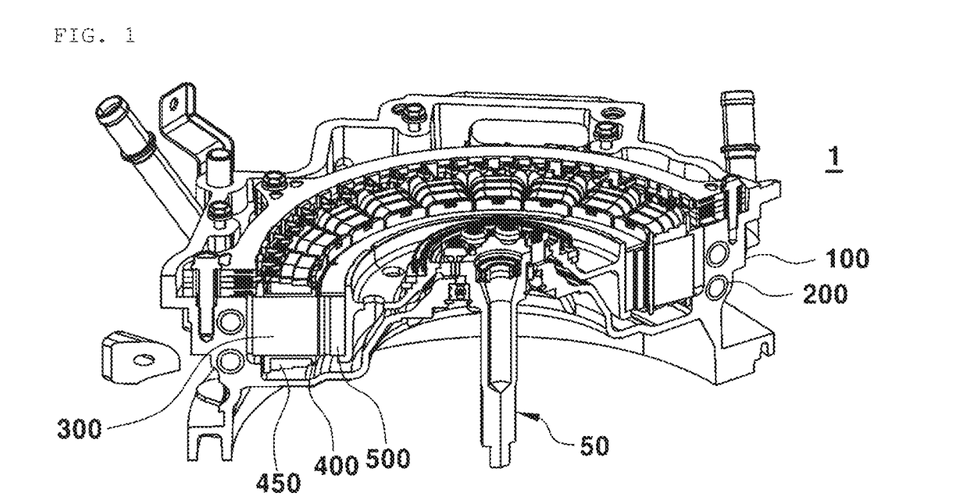
FIG. 1 is a diagram showing a driving motor according to an embodiment of the present disclosure.

FIG. 1 is a diagram showing a driving motor according to an embodiment of the present disclosure.

Referring to FIG. 1, the driving motor 1 may include a motor housing 100, a cooling pipe 200, a stator core 300, a bobbin 400, and a rotor core 500. The driving motor 1 according to the embodiment of the present disclosure may be applied to a hybrid electric vehicle (HEV) or an electric vehicle (EV). The driving motor 1 may include the stator core 300 that is fixedly installed in the motor housing 100 to generate a magnetic flux. The driving motor 1 may also include the rotor core 500 that is disposed to be spaced apart from the stator core 300 by a predetermined gap and that rotates about a rotating shaft 50 as a driving shaft.

The motor housing 100 may be disposed to surround a plurality of stator cores 300. The stator cores 300 may be fixed to the motor housing 100 by press-fitting. The stator cores 300 may be fixed to be in direct contact with an inner surface of the motor housing 100. The bobbin 400 may be installed in each of the stator cores 300. A coil 450 may be wound around each bobbin 400.

The rotor core 500 may be disposed to be spaced apart from the stator core 300 by the predetermined gap. The rotor core 500 may be rotated by the rotation of the rotating shaft 50. The magnetic flux may be generated in the coil wound around the stator core 300 by the rotation of the rotor core 500.

The cooling pipe 200 may be inserted into the motor housing 100. The cooling pipe 200 may be disposed in the circumferential direction of a circle where the stator cores 300 are arranged. In other words, the cooling pipe 200 may be disposed to surround the stator cores 300 that are arranged about the rotating shaft 50 in the circumferential direction. The cooling pipe 200 may be disposed to overlap with the stator cores 300 in a direction perpendicular to a direction in which the rotating shaft 50 extends, thus serving as a path in which coolant for cooling the stator cores 300 flows. For example, the cooling pipe 200 may be formed of an aluminum material. The cooling pipe 200 may have a circular section. However, the sectional shape of the cooling pipe 200 may not be particularly limited.

The cooling pipe 200 may be provided in two stages in a direction parallel to the rotating shaft 50. When referring to the sectional shape of FIG. 1, two cooling pipes 200 may be disposed to overlap with each other in a vertical direction. The cooling pipe 200 may be disposed to surround the stator cores 300 in the motor housing 100 multiple times. The cooling pipe 200 may be disposed within a range defined by one surface and the other surface of the bobbin 400 in a direction parallel to the rotating shaft 50. The one surface of the bobbin 400 may be a surface having the highest level in a direction parallel to the rotating shaft 50. The other surface of the bobbin 400 may be a surface having the lowest level in a direction parallel to the rotating shaft 50.

According to the embodiment of the present disclosure, the stator core 300 is fixed to the motor housing 100 through a press-fitting process. Thus, a separate component (existing support ring) for connecting the motor housing 100 to the stator core 300 may be eliminated. As the support ring is eliminated, a process of manufacturing the driving motor 1 may be simplified, and the cost of manufacturing the driving motor 1 may be reduced.

According to the embodiment of the present disclosure, the cooling pipe 200 may be inserted into the motor housing 100 as close as possible to the stator core 300. Furthermore, a designer can design the diameter of the cooling pipe 200 as large as possible in the motor housing 100, thus improving the performance of cooling the stator core 300.

Figure 2:
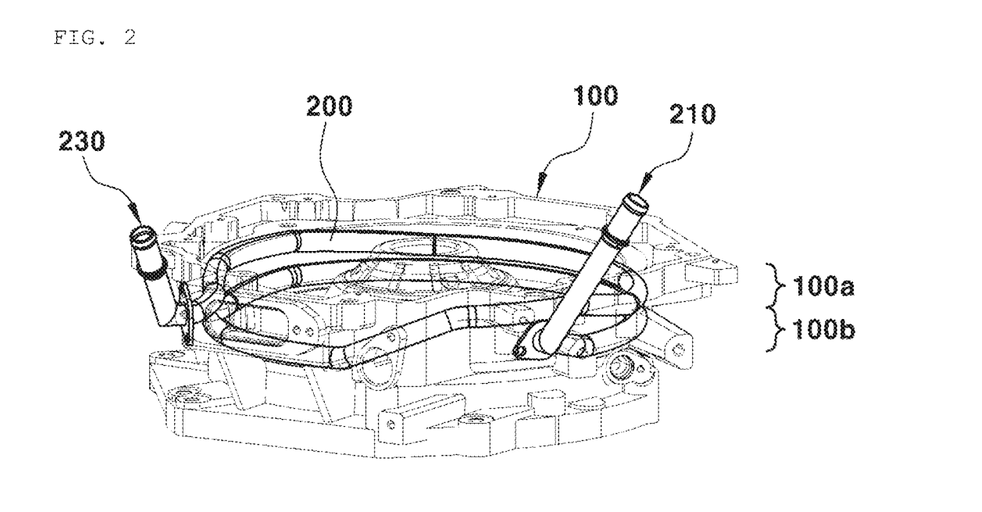
FIG. 2 is a perspective view showing a cooling-channel integrated motor housing according to the embodiment of the present disclosure.

FIG. 2 is a perspective view showing a cooling-channel integrated motor housing, i.e., a motor housing with an integrated cooling channel, according to the embodiment of the present disclosure.

Referring to FIGS. 1 and 2, the cooling pipe 200 may be disposed in the motor housing 100 to be wound multiple times. As the cooling pipe 200 is disposed to be wound multiple times, a portion of the cooling pipe 200 may be disposed relatively on an upper portion, and another portion of the cooling pipe 200 may be disposed relatively on a lower portion. In order to clearly describe the arrangement of the cooling pipe 200, the motor housing 100 is described in a two-layer structure.

The motor housing 100 may be formed in the two-layer structure in a direction in which the rotating shaft 50 extends. A coolant discharge nipple 230 may be disposed on an upper stage 100a of the motor housing 100. A coolant injection nipple 210 may be disposed on a lower stage 100b of the motor housing 100. The coolant injection nipple 210 and the coolant discharge nipple 230 are configured to be connected to the cooling pipe 200. The coolant injection nipple 210 and the coolant discharge nipple 230 may be connected to one end and the other end of the cooling pipe 200. The coolant injection nipple 210 and the coolant discharge nipple 230 may protrude in the circumferential direction of the motor housing 100 with respect to the rotating shaft 50. Therefore, one end and the other end of the cooling pipe 200 connected to the coolant injection nipple 210 and the coolant discharge nipple 230 may be bent in the circumferential direction with respect to the rotating shaft 50 within the motor housing 100.

According to the embodiment of the present disclosure, as the coolant is introduced and discharged by the coolant injection nipple 210 and the coolant discharge nipple 230, there is no risk that the coolant will leak into the driving motor 1. Thus, the performance of the driving motor is prevented from being deteriorated due to the leakage of the coolant.

Figure 3:
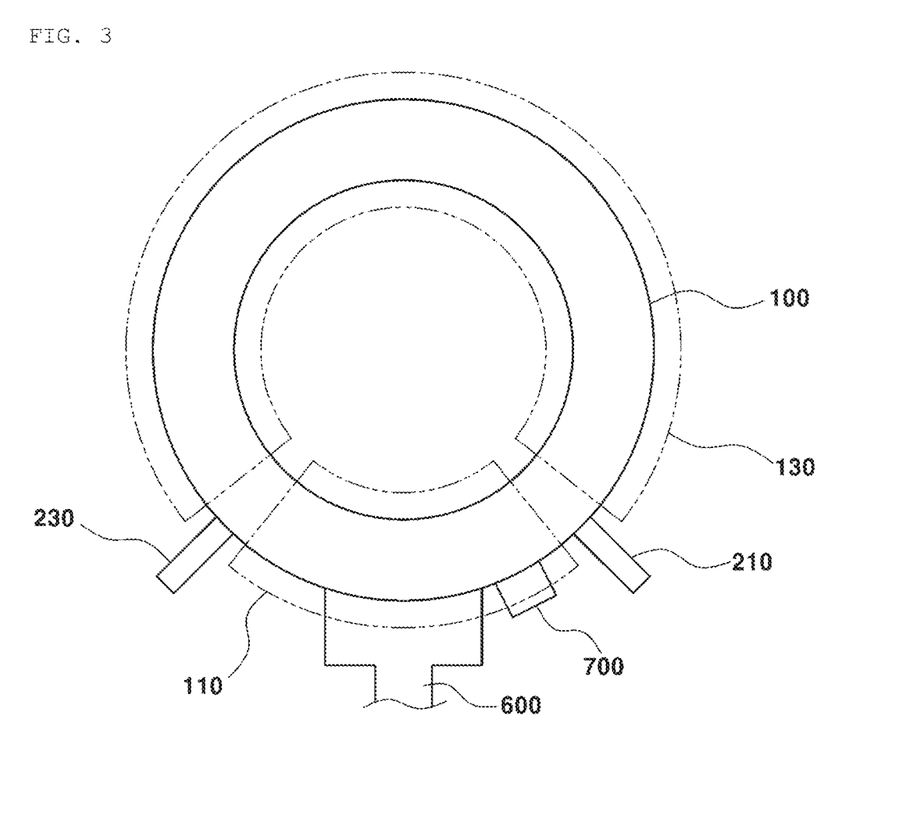
FIG. 3 is a plan view showing the cooling-channel integrated motor housing according to the embodiment of the present disclosure.

FIG. 3 is a plan view showing the cooling-channel integrated motor housing according to the embodiment of the present disclosure.

Referring to FIGS. 1 and 3, the motor housing 100 may be divided into a first region 110 and a second region 130 according to the wound state of the cooling pipe 200. The first region 110 may mean a space between the coolant injection nipple 210 and the coolant discharge nipple 230, and the second region 130 may be a space other than the first region 110. For example, the first region 110 may mean a space that is relatively smaller than the second region 130.

The cooling pipe 200 may be provided in one stage in the first region 110, and the cooling pipe 200 may be provided in two stages in the second region 130. In other words, the second region 130 of the motor housing 100 may mean a portion where the cooling pipe 200 is wound several times, and the first region 110 of the motor housing 100 may mean a portion where the cooling pipe 200 is wound once. The cooling pipe 200 may be provided in two stages to overlap in a direction parallel to the rotating shaft 500. The cooling pipe 200 may be connected to the coolant injection nipple 210 into which the coolant flows and to the coolant discharge nipple 230 out of which the coolant flows. Also, the coolant injection nipple 210 and the coolant discharge nipple 230 may protrude out from the motor housing 100. As a result, there may be a portion where the cooling pipe 200 is relatively less wound about the rotating shaft 50. In the embodiment of the present disclosure, the portion where the cooling pipe 200 is wound a relatively small number of times is defined as the first region 110.

A high-voltage connector 600 and a sensor connector 700 may be attached to the first region 110 of the motor housing 100. The high-voltage connector 600 may be a component for supplying power to the driving motor 1. The sensor connector 700 may be a component that is connected to a component (e.g. a resolver) for reading the position of the rotor 500 of the driving motor 1 and that is used to input and output a signal. The high-voltage connector 600 and the sensor connector 700 should be essentially connected to the driving motor 1. As a result, they may be connected to the motor housing 100 between the coolant injection nipple 210 and the coolant discharge nipple 230. Portions at which the high-voltage connector 600 and the sensor connector 700 are connected to the motor housing 100 may be limited by the cooling pipe 200 that is inserted into the motor housing 100 to surround the stator core 300. Therefore, the high-voltage connector 600 and the sensor connector 700 may be connected to the first region 110. The first region 110 can have a relatively large space in the motor housing 100 because the cooling pipe 200 is wound a relatively small number of times.

In the embodiment of the present disclosure, since the cooling pipe 200 is inserted into the motor housing 100, a space in which the motor housing 100 and a peripheral component may be connected may be insufficient. Therefore, the peripheral component of the driving motor 1 may be connected to a space between the coolant injection nipple 210 and the coolant discharge nipple 230 and in which the cooling pipe 200 is wound relatively less. Thus, even if an area of the cooling pipe 200 occupied in the motor housing 100 is increased, the peripheral component of the driving motor 1 and the motor housing 100 may be easily connected to each other.

Figure 4:
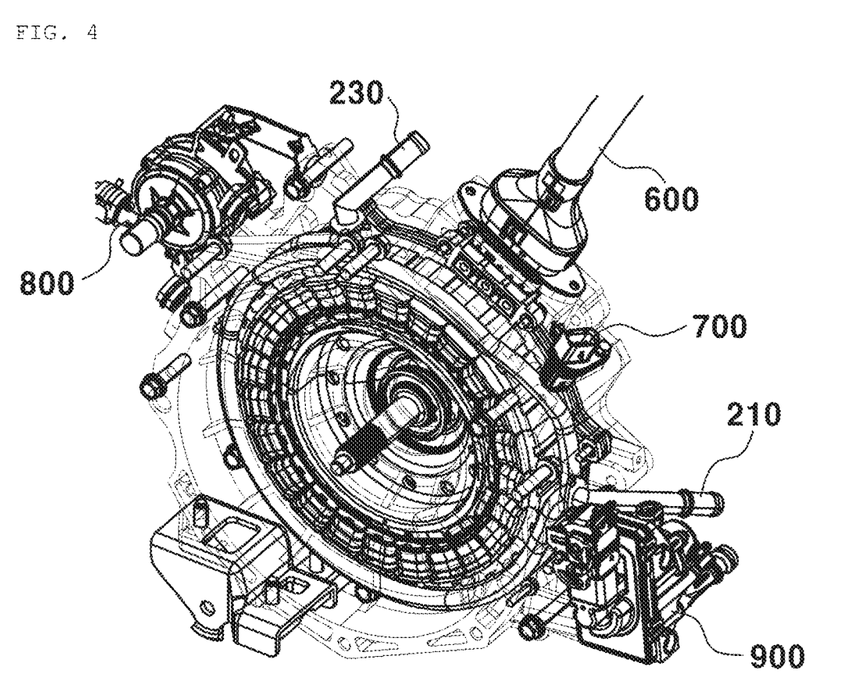
FIG. 4 is a diagram showing the driving motor and peripheral components attached to the driving motor according to the embodiment of the present disclosure.

FIG. 4 is a diagram showing the driving motor and peripheral components attached to the driving motor according to the embodiment of the present disclosure.

Referring to FIGS. 3 and 4, the peripheral components may be attached to the driving motor 1. The peripheral components may be divided into a component that applies power or a control signal to the driving motor 1 and into a component that is attached to the motor housing 100 on a fastening structure of an engine and a transmission.

The high-voltage connector 600 and the sensor connector 700 may be attached to the first region 110 of the motor housing 100. The high-voltage connector 600 may be the component for supplying power to the driving motor 1. The sensor connector 700 may be the component that is connected to the component (e.g. a resolver) for reading the position of the rotor 500 and is used to input and output the signal. Since the high-voltage connector 600 and the sensor connector 700 are components that are directly associated with the driving of the driving motor 1, they may be physically/electrically connected to components disposed in the driving motor 1. Therefore, an interior of a portion of the motor housing 100 requires a space in which components for physical/electrical connection are disposed and to which the high-voltage connector 600 and the sensor connector 700 are connected.

A water pump 800 and a clutch actuator 900 may be disposed in the second region 130 of the motor housing 100. The water pump 800 and the clutch actuator 900 may not be components that are directly associated with the driving of the driving motor 1. In other words, the water pump 800 and the clutch actuator 900 may be components that are driven independently of the driving motor 1. Therefore, even if the water pump 800 and the clutch actuator 900 are attached to the second region 130, which has a relatively small space in the motor housing 100, they may not affect the driving of the driving motor 1.

Figure 5:
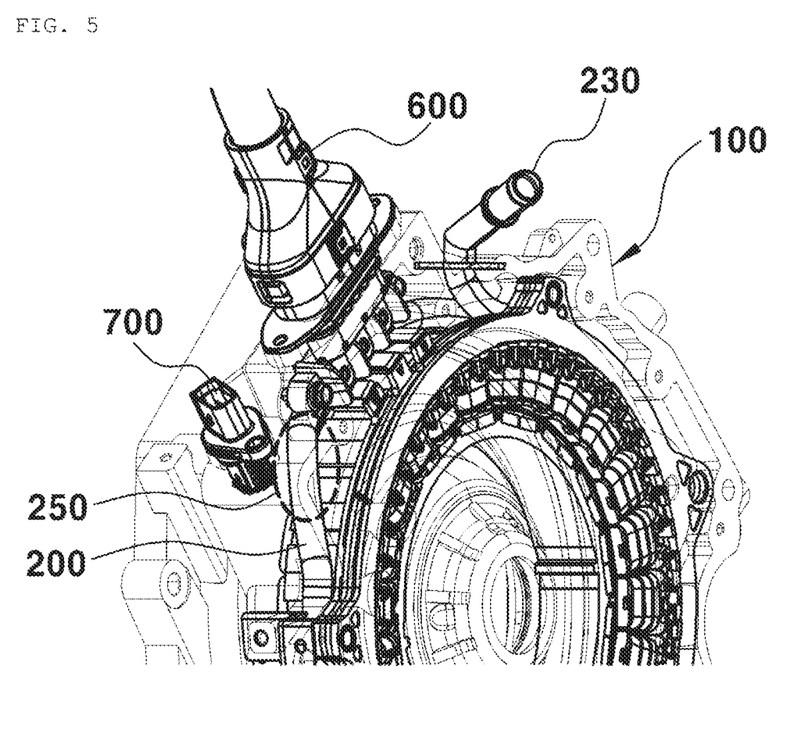
FIG. 5 is a diagram showing a bent part of a cooling pipe according to the embodiment of the present disclosure.

FIG. 5 is a diagram showing a bent part of the cooling pipe according to the embodiment of the present disclosure.

Referring to FIGS. 2, 3, and 5, the cooling pipe 200 may have the bent part 250 that is bent from a lower stage 100b to an upper stage 100a of the motor housing 100 by the sensor connector 700 provided in the first region 110 of the motor housing 100. The bent part 250 may mean a portion of the cooling pipe 200. The sensor connector 700 is attached to the first region 110, and the sensor connector 700 and the cooling pipe 200 should be spaced apart from each other. However, because the cooling pipe 200 is disposed on the lower stage 100b of the motor housing 100 in the first region 110, and because the sensor connector 700 is also spaced apart from the high-voltage connector 600, the bent part may be disposed on the lower stage 100b of the motor housing 100. Therefore, a portion of the cooling pipe 200 may be bent to be spaced apart from the sensor connector 700. According to the embodiment of the present disclosure, the bent part 250 of the cooling pipe 200 may be disposed on a portion adjacent to the high-voltage connector 600 and the sensor connector 700. The cooling pipe 200 may be bent towards the upper stage 100a of the motor housing 100 to avoid the sensor connector 700 disposed on the lower stage 100b of the motor housing 100. This part of the cooling pipe 200 may be defined as the bent part 250.

Figure 6:
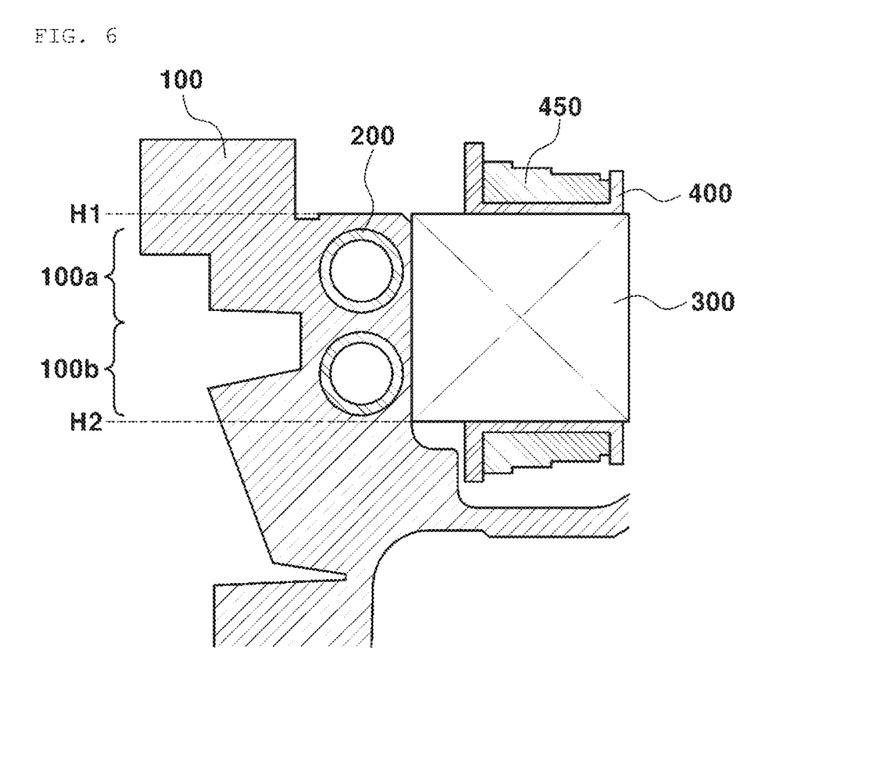
FIG. 6 is a diagram showing a cooling pipe according to a modification of the present disclosure.

FIG. 6 is a diagram showing a cooling pipe according to a modification of the present disclosure.

Referring to FIGS. 1 and 6, the arrangement relationship between the cooling pipe 200 and the stator core 300 may be changed to increase the efficiency of cooling the stator core 300. To be more specific, the cooling pipe 200 may be disposed to overlap with the stator cores 300 in a direction perpendicular to a direction in which the rotating shaft 50 of the driving motor 1 extends. The cooling pipe 200 may be located at the same height level as the stator cores 300 in the direction in which the rotating shaft 50 extends. A portion of the cooling pipe 200 may be disposed on the upper stage 100a of the motor housing 100, and another portion of the cooling pipe 200 may be disposed on the lower stage 100b of the motor housing 100.

By way of example, the cooling pipe 200 in the second region of the motor housing 100 may be arranged so as not to protrude above a height level H1 of an upper surface of the stator core 300 and below a height level H2 of a lower surface thereof in a direction parallel to the rotating shaft 500 of the driving motor 1.

Unlike the above-described example, the cooling pipe 200 in the second region of the motor housing 100 may be arranged so as not to protrude above a height level of an upper surface of the bobbin 400 and below a height level of a lower surface thereof in the direction parallel to the rotating shaft 500 of the driving motor 1.

According to the embodiment of the present disclosure, the position of the cooling pipe 200 may be disposed at a height similar to that of the stator core 300. In other words, the coolant circulating in the cooling pipe 200 may approach the stator core 300 as close as possible to cool the stator core 300. Therefore, the efficiency of cooling the stator core 300 can be improved.

Although the present disclosure has been described with reference to specific embodiments shown in the drawings, it should be apparent to those having ordinary skill in the art that the present disclosure may be changed and modified in various ways without departing from the scope of the present disclosure, which is described in the following claims. Therefore, it should be understood that the above-described embodiments are illustrative in all aspects but are not restrictive.

What is claimed is:

1. A cooling-channel integrated motor housing, comprising:
   a motor housing;
   a plurality of stator cores press-fitted into the motor housing; and
   a cooling pipe inserted into the motor housing and disposed in a circumferential direction of a circle along which the stator cores are arranged,
   wherein the cooling pipe is disposed to overlap with the stator cores in a direction perpendicular to a direction in which a rotating shaft of a motor extends,
   wherein the cooling pipe is connected to a coolant injection nipple and a coolant discharge nipple installed in the motor housing,
   wherein the motor housing comprises a first region between the coolant injection nipple and the coolant discharge nipple, and a second region other than the first region,
   wherein the cooling pipe is provided in one stage in the first region,
   wherein the cooling pipe is provided in two stages in the second region, and
   wherein a high-voltage connector is provided in the first region.

2. The cooling-channel integrated motor housing of claim 1, wherein the cooling pipe is provided in two stages in a direction parallel to the rotating shaft of the motor, wherein the coolant discharge nipple is disposed on an upper stage of the motor housing in the direction in which the rotating shaft extends, and wherein the coolant injection nipple is disposed on a lower stage of the motor housing.

3. The cooling-channel integrated motor housing of claim 1, wherein the cooling pipe in the second region is disposed so as not to protrude above a height level of an upper surface of the stator core and below a height level of a lower surface thereof in a direction parallel to the rotating shaft of the motor.

4. The cooling-channel integrated motor housing of claim 1, wherein the cooling pipe comprises a bent part that is bent from a lower stage to an upper stage of the motor housing by a sensor connector provided in the first region.

5. The cooling-channel integrated motor housing of claim 1, wherein one end and another end of the cooling pipe connected to the coolant injection nipple and the coolant discharge nipple are bent in a circumferential direction with respect to the rotating shaft of the motor.

6. The cooling-channel integrated motor housing of claim 1, wherein a sensor connector is provided in the first region.

7. The cooling-channel integrated motor housing of claim 1, wherein the cooling pipe is formed of an aluminum material.

8. A cooling-channel integrated motor housing, comprising:
   a motor housing;
   a plurality of stator cores press-fitted into the motor housing; and
   a cooling pipe inserted into the motor housing and disposed in a circumferential direction of a circle along which the stator cores are arranged,
   wherein the cooling pipe is disposed to overlap with the stator cores in a direction perpendicular to a direction in which a rotating shaft of a motor extends,
   wherein the cooling pipe is connected to a coolant injection nipple and a coolant discharge nipple installed in the motor housing, wherein the motor housing comprises a first region between the coolant injection nipple and the coolant discharge nipple, and a second region other than the first region,
wherein a high-voltage connector is provided in the first region, and
wherein a water pump and a clutch actuator are attached to the motor housing, and wherein the water pump and the clutch actuator are attached to the second region of the motor housing.

\* \* \* \* \*